(12) United States Patent
Telefus et al.

(10) Patent No.: US 11,349,297 B2
(45) Date of Patent: May 31, 2022

(54) INTELLIGENT CIRCUIT INTERRUPTION

(71) Applicant: Amber Solutions, Inc., Dublin, CA (US)

(72) Inventors: Mark Telefus, Orinda, CA (US); Thar Casey, Danville, CA (US); Chris Casey, San Francisco, CA (US)

(73) Assignee: Amber Solutions, Inc., Dublin, CA (US)

( * ) Notice: Subject to any disclaimer, the term of this patent is extended or adjusted under 35 U.S.C. 154(b) by 0 days.

(21) Appl. No.: 17/154,625

(22) Filed: Jan. 21, 2021

(65) Prior Publication Data

US 2021/0226441 A1    Jul. 22, 2021

Related U.S. Application Data

(60) Provisional application No. 62/964,078, filed on Jan. 21, 2020.

(51) Int. Cl.
  *H02H 3/16*    (2006.01)
  *H02H 1/00*    (2006.01)

(52) U.S. Cl.
  CPC .......... *H02H 3/162* (2013.01); *H02H 1/0015* (2013.01)

(58) Field of Classification Search
  CPC ......... H02H 1/0015; H02H 3/10; H02H 3/162
  See application file for complete search history.

(56) References Cited

U.S. PATENT DOCUMENTS 3,638,102 A    1/1972  Pelka
3,777,253 A   12/1973  Callan
(Continued)

FOREIGN PATENT DOCUMENTS

CN    109075551 B    1/2021
EP     0016646 A1   10/1980
(Continued)

OTHER PUBLICATIONS

U.S. Appl. No. 17/032,759 filed in the name of Mark D. Telefus et al. on Sep. 25, 2020, and entitled "AC-Driven Light-Emitting Diode Systems."

(Continued)

*Primary Examiner* — Jared Fureman
*Assistant Examiner* — Nicolas Bellido
(74) *Attorney, Agent, or Firm* — Ryan, Mason & Lewis, LLP

(57) ABSTRACT

A circuit interrupter device includes line hot, line neutral, load hot, and load neutral terminals, a solid-state switch, internal short-circuit switch circuitry, and control circuitry. The solid-state switch is connected in an electrical path between the line hot and load hot terminals. The internal short-circuit switch circuitry comprises an internal short-circuit switch and a shunt resistor serially connected between the line hot and line neutral terminals. The control circuitry is configured to detect for an occurrence of a fault condition and in response to detecting the occurrence of a fault condition, the control circuitry is configured to drive the solid-state switch into a switched-off state, and activate the internal short-circuit switch to generate an internal short-circuit path between the line hot and line neutral terminals and allow short-circuit current to flow through the shunt resistor between the line hot terminal and the line neutral terminal of the circuit interrupter device.

20 Claims, 3 Drawing Sheets

(56) References Cited

U.S. PATENT DOCUMENTS

| | | |
|---|---|---|
| 4,074,345 A | 2/1978 | Ackermann |
| 4,127,895 A | 11/1978 | Krueger |
| 4,245,148 A | 1/1981 | Gisske et al. |
| 4,245,184 A | 1/1981 | Billings et al. |
| 4,245,185 A | 1/1981 | Mitchell et al. |
| 4,257,081 A | 3/1981 | Sauer et al. |
| 4,466,071 A | 8/1984 | Russell, Jr. |
| 4,487,458 A | 12/1984 | Janutka |
| 4,581,540 A | 4/1986 | Guajardo |
| 4,631,625 A | 12/1986 | Alexander et al. |
| 4,636,907 A | 1/1987 | Howell |
| 4,649,302 A | 3/1987 | Damiano et al. |
| 4,653,084 A | 3/1987 | Ahuja |
| 4,682,061 A | 7/1987 | Donovan |
| 4,685,046 A | 8/1987 | Sanders |
| 4,709,296 A | 11/1987 | Hung et al. |
| 4,760,293 A | 7/1988 | Hebenstreit |
| 4,766,281 A | 8/1988 | Buhler |
| 4,812,995 A | 3/1989 | Girgis et al. |
| 4,888,504 A | 12/1989 | Kinzer |
| 5,121,282 A | 6/1992 | White |
| 5,276,737 A | 1/1994 | Micali |
| 5,307,257 A | 4/1994 | Fukushima |
| 5,371,646 A | 12/1994 | Biegelmeier |
| 5,410,745 A | 4/1995 | Friesen et al. |
| 5,559,656 A | 9/1996 | Chokhawala |
| 5,646,514 A | 7/1997 | Tsunetsugu |
| 5,654,880 A | 8/1997 | Brkovic et al. |
| 5,731,732 A | 3/1998 | Williams |
| 5,793,596 A | 8/1998 | Jordan et al. |
| 5,796,274 A | 8/1998 | Willis et al. |
| 5,870,009 A | 2/1999 | Serpinet et al. |
| 5,933,305 A | 8/1999 | Schmalz et al. |
| 6,081,123 A | 6/2000 | Kasbarian et al. |
| 6,111,494 A | 8/2000 | Fischer et al. |
| 6,115,267 A | 9/2000 | Herbert |
| 6,141,197 A | 10/2000 | Kim et al. |
| 6,160,689 A | 12/2000 | Stolzenberg |
| 6,167,329 A | 12/2000 | Engel et al. |
| 6,169,391 B1 | 1/2001 | Lei |
| 6,188,203 B1 | 2/2001 | Rice et al. |
| 6,300,748 B1 | 10/2001 | Miller |
| 6,369,554 B1 | 4/2002 | Aram |
| 6,483,290 B1 | 11/2002 | Hemminger et al. |
| 6,515,434 B1 | 2/2003 | Biebl |
| 6,538,906 B1 | 3/2003 | Ke et al. |
| 6,756,998 B1 | 6/2004 | Bilger |
| 6,788,512 B2 | 9/2004 | Vicente et al. |
| 6,813,720 B2 | 11/2004 | Leblanc |
| 6,839,208 B2 | 1/2005 | Macbeth et al. |
| 6,843,680 B2 | 1/2005 | Gorman |
| 6,906,476 B1 | 6/2005 | Beatenbough et al. |
| 6,984,988 B2 | 1/2006 | Yamamoto |
| 7,045,723 B1 | 5/2006 | Projkovski |
| 7,053,626 B2 | 5/2006 | Monter et al. |
| 7,110,225 B1 | 9/2006 | Hick |
| 7,164,238 B2 | 1/2007 | Kazanov et al. |
| 7,297,603 B2 | 11/2007 | Robb et al. |
| 7,304,828 B1 | 12/2007 | Shvartsman |
| D558,683 S | 1/2008 | Pape et al. |
| 7,319,574 B2 | 1/2008 | Engel |
| D568,253 S | 5/2008 | Gorman |
| 7,367,121 B1 | 5/2008 | Gorman |
| 7,586,285 B2 | 9/2009 | Gunji |
| 7,595,680 B2 | 9/2009 | Morita et al. |
| 7,610,616 B2 | 10/2009 | Masuouka et al. |
| 7,633,727 B2 | 12/2009 | Zhou et al. |
| 7,643,256 B2 | 1/2010 | Wright et al. |
| 7,693,670 B2 | 4/2010 | Durling et al. |
| 7,715,216 B2 | 5/2010 | Liu et al. |
| 7,729,147 B1 | 6/2010 | Wong et al. |
| 7,731,403 B2 | 6/2010 | Lynam et al. |
| 7,746,677 B2 | 6/2010 | Unkrich |
| 7,821,023 B2 | 10/2010 | Yuan et al. |
| D638,355 S | 5/2011 | Chen |
| 7,936,279 B2 | 5/2011 | Tang et al. |
| 7,948,719 B2 | 5/2011 | Xu |
| 8,124,888 B2 | 2/2012 | Etemad-Moghadam et al. |
| 8,256,675 B2 | 9/2012 | Baglin et al. |
| 8,374,729 B2 | 2/2013 | Chapel et al. |
| 8,463,453 B2 | 6/2013 | Parsons, Jr. |
| 8,482,885 B2 | 7/2013 | Billingsley et al. |
| 8,560,134 B1 | 10/2013 | Lee |
| 8,649,883 B2 | 2/2014 | Lu et al. |
| 8,664,886 B2 | 3/2014 | Ostrovsky |
| 8,717,720 B2 | 5/2014 | DeBoer |
| 8,718,830 B2 | 5/2014 | Smith |
| 8,781,637 B2 | 7/2014 | Eaves |
| 8,817,441 B2 | 8/2014 | Callanan |
| 8,890,371 B2 | 11/2014 | Gotou |
| D720,295 S | 12/2014 | Dodal et al. |
| 8,947,838 B2 | 2/2015 | Yamai et al. |
| 9,054,587 B2 | 6/2015 | Neyman |
| 9,055,641 B2 | 6/2015 | Shteynberg et al. |
| 9,287,792 B2 | 3/2016 | Telefus et al. |
| 9,325,516 B2 | 4/2016 | Pera et al. |
| 9,366,702 B2 | 6/2016 | Steele et al. |
| 9,439,318 B2 | 9/2016 | Chen |
| 9,443,845 B1 | 9/2016 | Stafanov et al. |
| 9,502,832 B1 | 11/2016 | Ullahkhan et al. |
| 9,509,083 B2 | 11/2016 | Yang |
| 9,515,560 B1 | 12/2016 | Telefus et al. |
| 9,577,420 B2 | 2/2017 | Ostrovsky et al. |
| 9,621,053 B1 | 4/2017 | Telefus |
| 9,774,182 B2 | 9/2017 | Phillips |
| 9,836,243 B1 | 12/2017 | Chanler et al. |
| D814,424 S | 4/2018 | DeCosta |
| 9,965,007 B2 | 5/2018 | Amelio et al. |
| 9,990,786 B1 | 6/2018 | Ziraknejad |
| 9,991,633 B2 | 6/2018 | Robinet |
| 10,072,942 B2 | 9/2018 | Wootton et al. |
| 10,101,716 B2 | 10/2018 | Kim |
| 10,187,944 B2 | 1/2019 | MacAdam et al. |
| 10,469,077 B2 | 11/2019 | Telefus et al. |
| D879,056 S | 3/2020 | Telefus |
| D881,144 S | 4/2020 | Telefus |
| 10,615,713 B2 | 4/2020 | Telefus et al. |
| 10,645,536 B1 | 5/2020 | Barnes et al. |
| 10,756,662 B2 | 8/2020 | Steiner et al. |
| 10,812,072 B2 | 10/2020 | Telefus et al. |
| 10,812,282 B2 | 10/2020 | Telefus et al. |
| 10,819,336 B2 | 10/2020 | Telefus et al. |
| 10,834,792 B2 | 11/2020 | Telefus et al. |
| 10,887,447 B2 | 1/2021 | Jakobsson et al. |
| 10,936,749 B2 | 3/2021 | Jakobsson |
| 10,951,435 B2 | 3/2021 | Jakobsson |
| 10,985,548 B2 | 4/2021 | Telefus |
| 10,992,236 B2 | 4/2021 | Telefus et al. |
| 10,993,082 B2 | 4/2021 | Jakobsson |
| 11,064,586 B2 * | 7/2021 | Telefus ............... H05B 45/44 |
| 2002/0109487 A1 | 8/2002 | Telefus et al. |
| 2003/0052544 A1 | 3/2003 | Yamamoto et al. |
| 2003/0063420 A1 | 4/2003 | Pahl et al. |
| 2003/0151865 A1 | 8/2003 | Maio |
| 2004/0032756 A1 | 2/2004 | Van Den Bossche |
| 2004/0251884 A1 | 12/2004 | Steffie et al. |
| 2005/0162139 A1 | 7/2005 | Hirst |
| 2005/0185353 A1 | 8/2005 | Rasmussen et al. |
| 2005/0286184 A1 | 12/2005 | Campolo |
| 2006/0285366 A1 | 12/2006 | Radecker et al. |
| 2007/0008747 A1 | 1/2007 | Soldano et al. |
| 2007/0018506 A1* | 1/2007 | Paik .................. H02J 9/06 307/115 |
| 2007/0143826 A1 | 6/2007 | Sastry et al. |
| 2007/0159745 A1 | 7/2007 | Berberich et al. |
| 2007/0188025 A1 | 8/2007 | Keagy et al. |
| 2007/0236152 A1 | 10/2007 | Davis et al. |
| 2008/0006607 A1 | 1/2008 | Boeder et al. |
| 2008/0136581 A1 | 6/2008 | Heilman et al. |
| 2008/0151444 A1 | 6/2008 | Upton |
| 2008/0174922 A1 | 7/2008 | Kimbrough |
| 2008/0180866 A1 | 7/2008 | Wong |
| 2008/0204950 A1 | 8/2008 | Zhou et al. |
| 2008/0253153 A1 | 10/2008 | Wu et al. |

(56) References Cited

U.S. PATENT DOCUMENTS

| | | |
|---|---|---|
| 2008/0281472 A1 | 11/2008 | Podgorny et al. |
| 2009/0034139 A1 | 2/2009 | Martin |
| 2009/0067201 A1 | 3/2009 | Cai |
| 2009/0168273 A1 | 7/2009 | Yu et al. |
| 2009/0195349 A1 | 8/2009 | Frader-Thompson et al. |
| 2009/0203355 A1 | 8/2009 | Clark |
| 2009/0213629 A1 | 8/2009 | Liu et al. |
| 2009/0284385 A1 | 11/2009 | Tang et al. |
| 2010/0091418 A1 | 4/2010 | Xu |
| 2010/0145479 A1 | 6/2010 | Griffiths |
| 2010/0145542 A1 | 6/2010 | Chapel et al. |
| 2010/0156369 A1 | 6/2010 | Kularatna et al. |
| 2010/0188054 A1 | 7/2010 | Asakura et al. |
| 2010/0231135 A1 | 9/2010 | Hum et al. |
| 2010/0231373 A1 | 9/2010 | Romp |
| 2010/0244730 A1 | 9/2010 | Nerone |
| 2010/0261373 A1 | 10/2010 | Roneker |
| 2010/0284207 A1 | 11/2010 | Watanabe et al. |
| 2010/0296207 A1 | 11/2010 | Schumacher et al. |
| 2010/0320840 A1 | 12/2010 | Fridberg |
| 2011/0062936 A1 | 3/2011 | Bartelous |
| 2011/0121752 A1 | 5/2011 | Newman, Jr. et al. |
| 2011/0127922 A1 | 6/2011 | Sauerlaender |
| 2011/0156610 A1 | 6/2011 | Ostrovsky et al. |
| 2011/0273103 A1 | 11/2011 | Hong |
| 2011/0292703 A1 | 12/2011 | Cuk |
| 2011/0299547 A1 | 12/2011 | Diab et al. |
| 2011/0301894 A1 | 12/2011 | Sanderford, Jr. |
| 2011/0305054 A1 | 12/2011 | Yamagiwa et al. |
| 2011/0307447 A1 | 12/2011 | Sabaa et al. |
| 2012/0026632 A1 | 2/2012 | Acharya et al. |
| 2012/0075897 A1 | 3/2012 | Fujita |
| 2012/0089266 A1 | 4/2012 | Tomimbang et al. |
| 2012/0095605 A1 | 4/2012 | Tran |
| 2012/0133289 A1 | 5/2012 | Hum et al. |
| 2012/0275076 A1 | 11/2012 | Shono |
| 2012/0311035 A1 | 12/2012 | Guha et al. |
| 2013/0051102 A1 | 2/2013 | Huang et al. |
| 2013/0057247 A1 | 3/2013 | Russell et al. |
| 2013/0063851 A1 | 3/2013 | Stevens et al. |
| 2013/0066478 A1 | 3/2013 | Smith |
| 2013/0088160 A1 | 4/2013 | Chai et al. |
| 2013/0119958 A1 | 5/2013 | Gasper |
| 2013/0128396 A1 | 5/2013 | Danesh et al. |
| 2013/0170261 A1 | 7/2013 | Lee et al. |
| 2013/0174211 A1 | 7/2013 | Aad et al. |
| 2013/0245841 A1 | 9/2013 | Ahn et al. |
| 2013/0253898 A1 | 9/2013 | Meagher et al. |
| 2013/0261821 A1 | 10/2013 | Lu et al. |
| 2013/0300534 A1 | 11/2013 | Myllymaki |
| 2013/0329331 A1 | 12/2013 | Erger et al. |
| 2014/0043732 A1 | 2/2014 | McKay et al. |
| 2014/0067137 A1 | 3/2014 | Amelio et al. |
| 2014/0074730 A1 | 3/2014 | Arensmeier et al. |
| 2014/0085940 A1 | 3/2014 | Lee et al. |
| 2014/0096272 A1 | 4/2014 | Makofsky et al. |
| 2014/0097809 A1 | 4/2014 | Follic et al. |
| 2014/0159593 A1 | 6/2014 | Chu et al. |
| 2014/0203718 A1 | 7/2014 | Yoon et al. |
| 2014/0246926 A1 | 9/2014 | Cruz et al. |
| 2014/0266698 A1 | 9/2014 | Hall et al. |
| 2014/0268935 A1 | 9/2014 | Chiang |
| 2014/0276753 A1 | 9/2014 | Wham et al. |
| 2015/0042274 A1 | 2/2015 | Kim et al. |
| 2015/0055261 A1 | 2/2015 | Lubick et al. |
| 2015/0097430 A1 | 4/2015 | Scruggs |
| 2015/0116886 A1 | 4/2015 | Zehnder et al. |
| 2015/0154404 A1 | 6/2015 | Patel et al. |
| 2015/0155789 A1 | 6/2015 | Freeman et al. |
| 2015/0180469 A1 | 6/2015 | Kim |
| 2015/0185261 A1 | 7/2015 | Frader-Thompson et al. |
| 2015/0216006 A1 | 7/2015 | Lee et al. |
| 2015/0236587 A1 | 8/2015 | Kim et al. |
| 2015/0253364 A1 | 9/2015 | Hieda et al. |
| 2015/0256355 A1 | 9/2015 | Pera et al. |
| 2015/0256665 A1 | 9/2015 | Pera et al. |
| 2015/0282223 A1 | 10/2015 | Wang et al. |
| 2015/0309521 A1 | 10/2015 | Pan |
| 2015/0317326 A1 | 11/2015 | Bandarupalli et al. |
| 2015/0355649 A1 | 12/2015 | Ovadia |
| 2015/0362927 A1 | 12/2015 | Giorgi |
| 2016/0012699 A1 | 1/2016 | Lundy |
| 2016/0018800 A1 | 1/2016 | Gettings et al. |
| 2016/0035159 A1 | 2/2016 | Ganapathy Achari et al. |
| 2016/0057841 A1 | 2/2016 | Lenig |
| 2016/0069933 A1 | 3/2016 | Cook et al. |
| 2016/0077746 A1 | 3/2016 | Muth et al. |
| 2016/0081143 A1 | 3/2016 | Wang |
| 2016/0110154 A1 | 4/2016 | Qureshi et al. |
| 2016/0117917 A1 | 4/2016 | Prakash et al. |
| 2016/0126031 A1 | 5/2016 | Wootton et al. |
| 2016/0178691 A1 | 6/2016 | Simonin |
| 2016/0181941 A1 | 6/2016 | Gratton et al. |
| 2016/0195864 A1 | 7/2016 | Kim |
| 2016/0247799 A1 | 8/2016 | Stafanov et al. |
| 2016/0259308 A1 | 9/2016 | Fadell et al. |
| 2016/0260135 A1 | 9/2016 | Zomet et al. |
| 2016/0277528 A1 | 9/2016 | Guilaume et al. |
| 2016/0294179 A1 | 10/2016 | Kennedy et al. |
| 2016/0343083 A1 | 11/2016 | Hering et al. |
| 2016/0360586 A1 | 12/2016 | Yang et al. |
| 2016/0374134 A1 | 12/2016 | Kweon et al. |
| 2017/0004948 A1 | 1/2017 | Leyh |
| 2017/0019969 A1 | 1/2017 | O'Neil et al. |
| 2017/0026194 A1 | 1/2017 | Vijayrao et al. |
| 2017/0033942 A1 | 2/2017 | Koeninger |
| 2017/0063225 A1 | 3/2017 | Guo et al. |
| 2017/0086281 A1 | 3/2017 | Avrahamy |
| 2017/0099647 A1 | 4/2017 | Shah et al. |
| 2017/0170730 A1 | 6/2017 | Sugiura |
| 2017/0171802 A1 | 6/2017 | Hou et al. |
| 2017/0179946 A1 | 6/2017 | Turvey |
| 2017/0195130 A1 | 7/2017 | Landow et al. |
| 2017/0212653 A1 | 7/2017 | Kanojia et al. |
| 2017/0230193 A1 | 8/2017 | Apte et al. |
| 2017/0244241 A1 | 8/2017 | Wilson et al. |
| 2017/0256934 A1 | 9/2017 | Kennedy et al. |
| 2017/0256941 A1 | 9/2017 | Bowers et al. |
| 2017/0256956 A1 | 9/2017 | Irish et al. |
| 2017/0277709 A1 | 9/2017 | Strauss et al. |
| 2017/0314743 A1 | 11/2017 | Del Castillo et al. |
| 2017/0322049 A1 | 11/2017 | Wootton et al. |
| 2017/0322258 A1 | 11/2017 | Miller et al. |
| 2017/0338809 A1 | 11/2017 | Stefanov et al. |
| 2017/0347415 A1 | 11/2017 | Cho et al. |
| 2017/0366950 A1 | 12/2017 | Arbon |
| 2018/0026534 A1 | 1/2018 | Turcan |
| 2018/0054862 A1 | 2/2018 | Takagimoto et al. |
| 2018/0061158 A1 | 3/2018 | Greene |
| 2018/0146369 A1 | 5/2018 | Kennedy, Jr. |
| 2018/0174076 A1 | 6/2018 | Fukami |
| 2018/0196094 A1 | 7/2018 | Fishburn et al. |
| 2018/0201302 A1 | 7/2018 | Sonoda et al. |
| 2018/0254959 A1 | 9/2018 | Mantyjarvi et al. |
| 2018/0285198 A1 | 10/2018 | Dantkale et al. |
| 2018/0287802 A1 | 10/2018 | Brickell |
| 2018/0301006 A1 | 10/2018 | Flint et al. |
| 2018/0307609 A1 | 10/2018 | Qiang et al. |
| 2018/0342329 A1 | 11/2018 | Rufo et al. |
| 2018/0359039 A1 | 12/2018 | Daoura et al. |
| 2018/0359223 A1 | 12/2018 | Maier et al. |
| 2019/0003855 A1 | 1/2019 | Wootton et al. |
| 2019/0020477 A1 | 1/2019 | Antonatos et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0052174 A1 | 2/2019 | Gong |
| 2019/0068716 A1 | 2/2019 | Lauer |
| 2019/0086979 A1 | 3/2019 | Kao et al. |
| 2019/0087835 A1 | 3/2019 | Schwed et al. |
| 2019/0104138 A1 | 4/2019 | Storms et al. |
| 2019/0122834 A1 | 4/2019 | Wootton et al. |
| 2019/0140640 A1 | 5/2019 | Telefus et al. |

(56) References Cited

U.S. PATENT DOCUMENTS

| | | | |
|---|---|---|---|
| 2019/0148931 A1* | 5/2019 | Li | H02H 1/0007 361/77 |
| 2019/0165691 A1 | 5/2019 | Telefus et al. | |
| 2019/0207375 A1 | 7/2019 | Telefus et al. | |
| 2019/0238060 A1 | 8/2019 | Telefus et al. | |
| 2019/0245457 A1 | 8/2019 | Telefus et al. | |
| 2019/0253243 A1 | 8/2019 | Zimmerman et al. | |
| 2019/0268176 A1 | 8/2019 | Pognant | |
| 2019/0280887 A1 | 9/2019 | Telefus et al. | |
| 2019/0306953 A1 | 10/2019 | Joyce et al. | |
| 2019/0334999 A1 | 10/2019 | Ryhorchuk et al. | |
| 2019/0355014 A1 | 11/2019 | Gerber | |
| 2019/0372331 A1 | 12/2019 | Liu et al. | |
| 2020/0007126 A1 | 1/2020 | Telefus et al. | |
| 2020/0014301 A1 | 1/2020 | Telefus | |
| 2020/0014379 A1 | 1/2020 | Telefus | |
| 2020/0044883 A1 | 2/2020 | Telefus et al. | |
| 2020/0052607 A1 | 2/2020 | Telefus et al. | |
| 2020/0053100 A1 | 2/2020 | Jakobsson | |
| 2020/0106259 A1 | 4/2020 | Telefus | |
| 2020/0106260 A1 | 4/2020 | Telefus | |
| 2020/0106637 A1 | 4/2020 | Jakobsson | |
| 2020/0120202 A1 | 4/2020 | Jakobsson et al. | |
| 2020/0145247 A1 | 5/2020 | Jakobsson | |
| 2020/0153245 A1 | 5/2020 | Jakobsson et al. | |
| 2020/0159960 A1 | 5/2020 | Jakobsson | |
| 2020/0193785 A1 | 6/2020 | Berglund et al. | |
| 2020/0196110 A1 | 6/2020 | Jakobsson | |
| 2020/0196412 A1 | 6/2020 | Telefus et al. | |
| 2020/0260287 A1 | 8/2020 | Hendel | |
| 2020/0275266 A1 | 8/2020 | Jakobsson | |
| 2020/0287537 A1 | 9/2020 | Telefus et al. | |
| 2020/0314233 A1 | 10/2020 | Mohalik et al. | |
| 2020/0328694 A1 | 10/2020 | Telefus et al. | |
| 2020/0344596 A1 | 10/2020 | Dong et al. | |
| 2020/0365345 A1 | 11/2020 | Telefus et al. | |
| 2020/0365346 A1 | 11/2020 | Telefus et al. | |
| 2020/0365356 A1 | 11/2020 | Telefus et al. | |
| 2020/0366078 A1 | 11/2020 | Telefus et al. | |
| 2020/0366079 A1 | 11/2020 | Telefus et al. | |
| 2020/0394332 A1 | 12/2020 | Jakobsson et al. | |
| 2021/0014947 A1 | 1/2021 | Telefus et al. | |
| 2021/0119528 A1 | 4/2021 | Telefus | |
| 2021/0173364 A1* | 6/2021 | Telefus | H02J 3/02 |

FOREIGN PATENT DOCUMENTS

| | | |
|---|---|---|
| EP | 0398026 A2 | 11/1990 |
| EP | 2560063 A1 | 2/2013 |
| GB | 2458699 A | 9/2009 |
| WO | 2010110951 A1 | 9/2010 |
| WO | 2016010529 A1 | 1/2016 |
| WO | 2016110833 A2 | 7/2016 |
| WO | 2017196571 A1 | 11/2017 |
| WO | 2017196572 A1 | 11/2017 |
| WO | 2017196649 A1 | 11/2017 |
| WO | 2018075726 A1 | 4/2018 |
| WO | 2018080604 A1 | 5/2018 |
| WO | 2018080614 A1 | 5/2018 |
| WO | 2018081619 A2 | 5/2018 |
| WO | 2018081619 A3 | 5/2018 |
| WO | 2019133110 A1 | 7/2019 |
| WO | 2020014158 A1 | 1/2020 |
| WO | 2020014161 A1 | 1/2020 |
| WO | PCT/US19/54102 | 2/2020 |
| WO | 2020072516 A1 | 4/2020 |
| WO | PCT/US19/67004 | 4/2020 |
| WO | 2020131977 A1 | 6/2020 |
| WO | PCT/US20/33421 | 9/2020 |
| WO | 2020236726 A1 | 11/2020 |
| WO | PCT/US21/14320 | 4/2021 |

OTHER PUBLICATIONS

U.S. Appl. No. 17/047,613 filed in the name of Mark Telefus et al. on Oct. 14, 2020, and entitled "Intelligent Circuit Breakers."

U.S. Appl. No. 17/115,753 filed in the name of Mark Telefus on Dec. 8, 2020, and entitled "Solid-State Power Interrupters."

U.S. Appl. No. 17/145,291 filed in the name of Mark Telefus et al. on Jan. 9, 2021, and entitled "Building Automation System."

U.S. Appl. No. 17/145,291 filed in the name of Bjorn Markus Jakobsson on Jan. 20, 2021, and entitled "Infrastructure Support to Enhance Resource-Constrained Device Capabilities."

U.S. Appl. No. 63/064,399 filed in the name of Mark Telefus et al. on Aug. 11, 2020, and entitled "Energy Traffic Monitoring and Control System."

F. Stajano et al., "The Resurrecting Duckling: Security Issues for Ad-hoc Wireless Networks," International Workshop on Security Protocols, 1999, 11 pages.

L. Sweeney, "Simple Demographics Often Identify People Uniquely," Carnegie Mellon University, Data Privacy Working Paper 3, 2000, 34 pages.

A. Narayanan et al., "Robust De-anonymization of Large Sparse Datasets," IEEE Symposium on Security and Privacy, May 2008, 15 pages.

M. Alahmad et al., "Non-Intrusive Electrical Load Monitoring and Profiling Methods for Applications in Energy Management Systems," IEEE Long Island Systems, Applications and Technology Conference, 2011, 7 pages.

K. Yang et al. "Series Arc Fault Detection Algorithm Based on Autoregressive Bispecturm Analysis," Algorithms, vol. 8, Oct. 16, 2015, pp. 929-950.

J.-E. Park et al., "Design on Topologies for High Efficiency Two-Stage AC-DC Converter," 2012 IEEE 7th International Power Electronics and Motion Control Conference—ECCE Asia, Jun. 2-5, 2012, China, 6 pages.

S. Cuk, "98% Efficient Single-Stage AC/DC Converter Topologies," Power Electronics Europe, Issue 4, 2011, 6 pages.

E. Carvou et al., "Electrical Arc Characterization for Ac-Arc Fault Applications," 2009 Proceedings of the 55th IEEE Holm Conference on Electrical Contacts, IEEE Explore Oct. 9, 2009, 6 pages.

C. Restrepo, "Arc Fault Detection and Discrimination Methods," 2007 Proceedings of the 53rd IEEE Holm Conference on Electrical Contacts, IEEE Explore Sep. 24, 2007, 8 pages.

K. Eguchi et al., "Design of a Charge-Pump Type AC-DC Converter for RF-ID Tags," 2006 International Symposium on Communications and Information Technologies, F4D-3, IEEE, 2006, 4 pages.

A. Ayari et al., " Active Power Measurement Comparison Between Analog and Digital Methods," International Conference on Electrical Engineering and Software Applications, 2013, 6 pages.

G. D. Gregory et al., "The Arc-Fault Circuit Interrupter, an Emerging Product," IEEE, 1998, 8 pages.

D. Irwin et al., "Exploiting Home Automation Protocols for Load Monitoring in Smart Buildings," BuildSys '11: Proceedings of the Third ACM Workshop on Embedded Sensing Systems for Energy-Efficiency in Buildings, Nov. 2011, 6 pages.

B. Mrazovac et al., "Towards Ubiquitous Smart Outlets for Safety and Energetic Efficiency of Home Electric Appliances," 2011 IEEE International Conference on Consumer Electronics, Berlin, German, Sep. 6-8, 2011, 5 pages.

J. K. Becker et al., "Tracking Anonymized Bluetooth Devices," Proceedings on Privacy Enhancing Technologies, vol. 3, 2019, pp. 50-65.

H. Siadati et al., "Mind your SMSes: Mitigating Social Engineering in Second Factor Authentication," Computers & Security, vol. 65, Mar. 2017, 12 pages.

S. Jerde, "The New York Times Can Now Predict Your Emotions and Motivations After Reading a Story," https://www.adweek.com/tv-video/the-new-york-times-can-now-predict-your-emotions-and-motivations-after-reading-a-story/, Apr. 29, 2019, 3 pages.

K. Mowery et al., "Pixel Perfect: Fingerprinting Canvas in HTML5," Proceedings of W2SP, 2012, 12 pages.

S. Kamkar, "Evercookie," https://samy.pl/evercookie/, Oct. 11, 2010, 5 pages.

M. K. Franklin et al., "Fair Exchange with a Semi-Trusted Third Party," Association for Computing Machinery, 1997, 6 pages.

(56) References Cited

OTHER PUBLICATIONS

J. Camenisch et al., "Digital Payment Systems with Passive Anonymity-Revoking Trustees," Journal of Computer Security, vol. 5, No. 1, 1997, 11 pages.

L. Coney et al., "Towards a Privacy Measurement Criterion for Voting Systems," Proceedings of the 2005 National Conference on Digital Government Research, 2005, 2 pages.

L. Sweeney, "k-anonymity: A Model for Protecting Privacy," International Journal of Uncertainty, Fuzziness and Knowledge-Based Systems, vol. 1, No. 5, 2002, 14 pages.

C. Dwork, "Differential Privacy," Encyclopedia of Cryptography and Security, 2011, 12 pages.

A. P. Felt et al., "Android Permissions: User Attention, Comprehension, and Behavior," Symposium on Usable Privacy and Security, Jul. 11-13, 2012, 14 pages.

S. Von Solms et al., "On Blind Signatures and Perfect Crimes," Computers & Security, vol. 11, No. 6, 1992, 3 pages.

R. Wyden, "Wyden Releases Discussion Draft of Legislation to Provide Real Protections for Americans' Privacy," https://www.wyden.senate.gov/news/press-releases/wyden-releases-discussion-draft-of-legislation-to-provide-real-protections-for-americans-privacy, Nov. 1, 2018, 3 pages.

M. Rubio, "Rubio Introduces Privacy Bill to Protect Consumers While Promoting Innovation," https://www.rubio.senate.gov/public/index.cfm/2019/1/rubio-introduces-privacy-bill-to-protect-consumers-while-promoting-innovation#:%7E:text=Washingt%E2%80%A6, Jan. 16, 2019, 2 pages.

C. Dwork et al., "Differential Privacy and Robust Statistics," 41st ACM Symposium on Theory of Computing, 2009, 10 pages.

J. Camenisch et al., "Compact E-Cash," Eurocrypt, vol. 3494, 2005, pp. 302-321.

D. L. Chaum, "Untraceable Electronic Mail, Return Addresses, and Digital Pseudonyms," Communications of the ACM, vol. 24, No. 2, Feb. 1981, pp. 84-88.

J. Camenisch et al., "An Efficient System For Nontransferable Anonymous Credentials With Optional Anonymity Revocation," International Conference on the Theory and Application of Cryptographic Techniques, May 6-10, 2001, 30 pages.

M. K. Reiter et al., "Crowds: Anonymity For Web Transactions," ACM Transactions on Information and System Security, vol. 1, 1997, 23 pages.

I. Clarke et al., "Freenet: A Distributed Anonymous Information Storage and Retrieval System," International Workshop on Designing Privacy Enhanching Technologies: Design Issues in Anonymity and Unobservability, 2001, 21 pages.

P. Golle et al., "Universal Re-encryption for Mixnets," Lecture Notes in Computer Science, Feb. 2004, 15 pages.

Y. Lindell et al., "Multiparty Computation for Privacy Preserving Data Mining," Journal of Privacy and Confidentiality, May 6, 2008, 39 pages.

J. Hollan et al., "Distributed Cognition: Toward a New Foundation for Human-Computer Interaction Research," ACM Transactions on Computer-Human Interaction, vol. 7, No. 2, Jun. 2000, pp. 174-196.

A. Adams et al., "Users are Not the Enemy," Communications of the ACM, Dec. 1999, 6 pages.

A. Morton et al., "Privacy is a Process, Not a Pet: a Theory for Effective Privacy Practice," Proceedings of the 2012 New Security Paradigms Workshop, Sep. 2012, 18 pages.

G. D. Abowd et al., "Charting Past, Present and Future Research in Ubiquitous Computing," ACM Transactions on Computer-Human Interaction, vol. 7, No. 1, Mar. 2000, pp. 29-58.

W. Mason et al., "Conducting Behavioral Research on Amazon's Mechanical Turk," Behavior Research Methods, Jun. 2011, 23 pages.

G. M. Gray et al., "Dealing with the Dangers of Fear: The Role of Risk Communication," Health Affairs, Nov. 2002, 11 pages.

L. Shengyuan et al., "Instantaneous Value Sampling AC-DC Converter and its Application in Power Quantity Detection," 2011 Third International Conference on Measuring Technology and Mechatronics Automation, Jan. 6-7, 2011, 4 pages.

H.-H. Chang et al., "Load Recognition for Different Loads with the Same Real Power and Reactive Power in a Nonintrusive Load-monitoring System," 2008 12th International Conference on Computer Supported Cooperative Work in Design, Apr. 16-18, 2008, 6 pages.

U.S. Appl. No. 17/153,280 filed in the name of Bjorn Markus Jakobsson on Jan. 20, 2021, and entitled "Infrastructure Support to Enhance Resource-Constrained Device Capabilities."

* cited by examiner

INTELLIGENT CIRCUIT INTERRUPTION

CROSS-REFERENCE TO RELATED APPLICATION

This application claims the benefit of U.S. Provisional Application Ser. No. 62/964,078, filed on Jan. 21, 2020, the disclosure of which is incorporated herein by reference.

TECHNICAL FIELD

This disclosure relates generally to circuit interruption techniques to protect electrical circuits from fault conditions such as arc-fault conditions.

BACKGROUND

In general, electrical circuit interrupters are components that are utilized in electrical distribution systems with a given building or home structure to protect branch circuit conductors and electrical loads from being exposed to, e.g., current overload conditions and fault conditions. A current overload condition is defined as operation of equipment in excess of its normal, full-load rating, or a branch circuit in excess of its ampacity which, when the overload persists for a sufficient period of time, would cause damage or dangerous overheating. Fault conditions comprise unintended or accidental load conditions that typically produce much higher over-current conditions than do overloads, depending on the impedance of the fault. A fault producing the maximum over-current condition is referred to as a short-circuit or a "bolted fault."

There are various types of electrical circuit interrupter devices including, but not limited to, arc-fault circuit interrupter (AFCI) devices. AFCI devices are designed to prevent electrical fires that can be caused by potentially dangerous arc-faults in electrical circuits. An arc-fault is an unintentional electrical arcing condition that occurs in an electrical circuit. Arcing can create high intensity heat that ignites surrounding material and causes a fire. An AFCI device is configured to detect an arcing condition in an electrical circuit and break the electric circuit to stop the arcing. An AFCI device is designed to distinguish between harmless electrical arcs that are generated as a result of normal operation of electrical devices (e.g., opening/closing of a contact or switch, operating a motor with brushes, operating household appliances such air conditioners, refrigerators, tools, etc.) and potentially dangerous electrical arcs that are caused by, e.g., damaged wire insulation, loose connections that cause arcing between the connections, broken conductors in electrical cords, etc., which can cause a series arc fault or a parallel arc fault.

By way of specific example, power receptacles (e.g., outlets) with worn contacts are a common cause of electrical arcing which can lead to electrical fires. Over time, the contact springs of a power receptacle become worn with the repeated insertion of electrical plugs, which causes the contact springs to lose tension and degrade the connection between the receptacle contacts and the terminals of the electrical plugs. This degradation in contact connection results in the generation of electrical arcs within the power receptacle which, over time, cause pitting, melting and spattering of the receptacle contacts, which can trigger dangerous electrical fires.

Conventional circuit breakers are typically configured to protect against current overload and short-circuit conditions, and do not protect against electrical arcing conditions that produce erratic, and often reduced current. In fact, arc-fault conditions in a branch circuit typically result in reduced current and voltages, which are not characteristic or indicative of short-circuit or overload conditions for which conventional circuit breakers are designed to protect against. For example, the RMS current value for a parallel arc-fault will be considerably less than the RMS current value of a bolted short-circuit fault. Therefore, a conventional typical 15-amp circuit breaker with no AFCI protection will not be able to clear the arc-fault before a fire is potentially ignited.

SUMMARY

Embodiments of the disclosure include circuit interrupter devices and methods to protect electrical circuits from fault conditions such as arc-fault conditions. For example, in one exemplary embodiment, a circuit interrupter device comprises a line hot terminal, a line neutral terminal, a load hot terminal, a load neutral terminal, a solid-state switch, internal short-circuit switch circuitry, and control circuitry. The solid-state switch is serially connected in an electrical path between the line hot terminal and the load hot terminal. The internal short-circuit switch circuitry comprises an internal short-circuit switch and a shunt resistor serially connected between a first node and a second node, wherein the first node is coupled to the line hot terminal and the second node is coupled to the line neutral terminal. The control circuitry is coupled to the solid-state switch and the internal short-circuit switch circuitry. The control circuitry is configured to detect for an occurrence of a fault condition and drive the solid-state switch into a switched-off state in response to detecting the occurrence of a fault condition. The control circuitry is further configured to activate the internal short-circuit switch in response to detecting the occurrence of a fault condition to thereby generate an internal short-circuit path between the first node and the second node and allow short-circuit current to flow through the shunt resistor between the line hot terminal and the line neutral terminal of the circuit interrupter device.

Another exemplary embodiment includes a system which comprise a circuit breaker and a circuit interrupter device. The circuit breaker comprises a line input terminal and a load output terminal, wherein the line input terminal of the circuit breaker is coupled to an alternating current (AC) power source. The circuit interrupter device is coupled to the load output terminal of the circuit breaker. The circuit interrupter device comprises a line hot terminal, a line neutral terminal, a load hot terminal, a load neutral terminal, a solid-state switch, internal short-circuit switch circuitry, and control circuitry. The solid-state switch is serially connected in an electrical path between the line hot terminal and the load hot terminal. The internal short-circuit switch circuitry comprises an internal short-circuit switch and a shunt resistor serially connected between a first node and a second node, wherein the first node is coupled to the line hot terminal and the second node is coupled to the line neutral terminal. The control circuitry is coupled to the solid-state switch and the internal short-circuit switch circuitry. The control circuitry is configured to detect for an occurrence of a fault condition and drive the solid-state switch into a switched-off state in response to detecting the occurrence of a fault condition. The control circuit is further configured to activate the internal short-circuit switch in response to detecting the occurrence of a fault condition to thereby generate an internal short-circuit path between the first node and the second node and allow short-circuit current to flow through the shunt resistor between the line hot terminal and the line neutral terminal of the circuit interrupter device, wherein the flow of short-circuit current between the line hot terminal and the line neutral terminal of the circuit interrupter device is sufficient to trip the circuit breaker.

Another exemplary embodiment includes a method that is implemented by a circuit interrupter device. The method comprises detecting an occurrence of a fault condition on a branch circuit that is protected by a circuit breaker, and interrupting a flow of load current on the branch circuit, in response to detecting the occurrence of the fault condition. The method further comprises generating a short-circuit path to allow a short-circuit current to flow through a shunt resistor within the circuit interrupter device, in response to detecting the occurrence of the fault condition, wherein the flow of the short-circuit current within the circuit interrupter device causes the circuit breaker to trip and disconnect an AC power source from the branch circuit.

Other embodiments will be described in the following detailed description of exemplary embodiments, which is to be read in conjunction with the accompanying figures.

DETAILED DESCRIPTION OF EXEMPLARY EMBODIMENTS

Embodiments of the disclosure will now be described in further detail with regard to circuit interrupter devices and methods to protect electrical circuits from fault conditions such as arc-fault conditions. The term "exemplary" as used herein means "serving as an example, instance, or illustration". Any embodiment or design described herein as "exemplary" is not to be construed as preferred or advantageous over other embodiments or designs.

Figure 1:
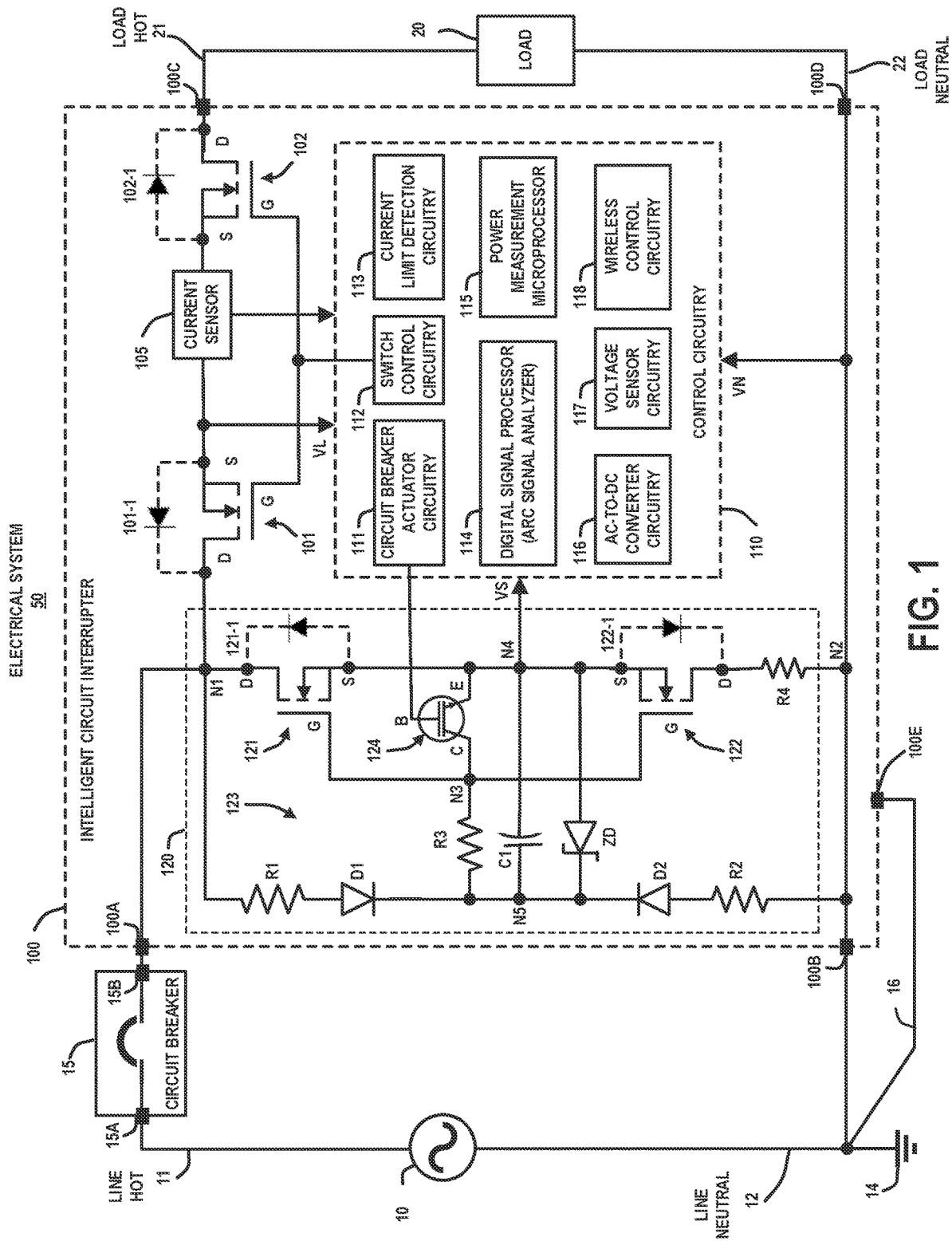
FIG. 1 schematically illustrates an electrical system which comprises an intelligent circuit interrupter device according to an exemplary embodiment of the disclosure.

FIG. 1 schematically illustrates an electrical system comprising an intelligent circuit interrupter device according to an exemplary embodiment of the disclosure. In particular, FIG. 1 schematically illustrates an electrical system 50 comprising a utility power supply 10 (referred to herein as AC mains 10), a circuit breaker 15, and a branch circuit comprising an intelligent circuit interrupter device 100 and a load 20. The AC mains 10 comprises a hot phase 11 (referred to as "line hot" 11) and a neutral phase 12 (referred to as "line neutral" 12). The circuit breaker 15 comprises a line input terminal 15A and a load output terminal 15B. The intelligent circuit interrupter device 100 comprises a line hot terminal 100A (or first input terminal), a line neutral terminal 100B (or second input terminal), a load hot terminal 100C (or first output terminal), a load neutral terminal 100D (or second output terminal), and an earth ground terminal 100E. The line input terminal 15A of the circuit breaker 15 is coupled to the line hot 11 of the AC mains 10, and the load output terminal 15B of the circuit breaker 15 is coupled to the line hot terminal 100A of the intelligent circuit interrupter device 100. The line neutral terminal 100B of the intelligent circuit interrupter device 100 is coupled to the line neutral 12 of the AC mains 10. The load hot terminal 100C of the intelligent circuit interrupter device 100 is coupled to a load hot line 21 of the load 20, and the load neutral terminal 100D of the intelligent circuit interrupter device 100 is coupled to a load neutral line 22 of the load 20.

In some embodiments such as shown in FIG. 1, the intelligent circuit interrupter device 100 is a device (e.g., first branch power receptacle) that is coupled to the branch circuit which is protected by the circuit breaker 15. In some embodiments, the intelligent circuit interrupter device 100 is a first device on the branch circuit downstream from the circuit breaker 15. In this regard, the load 20 is meant to generically represent (i) one or more electrical devices directly connected to the load side of the intelligent circuit interrupter device 100, (ii) one or more branch power receptacles (e.g., standard branch outlets) that are coupled to the load side of the intelligent circuit interrupter device 100, (iii) one or more electrical devices that are plugged into one or more of the branch power receptacles, or (iv) a combination of (i), (ii), and (iii).

As further illustrated in FIG. 1, the line neutral 12 of the AC mains 10 is bonded to earth ground 14 (GND). The earth ground 14 is typically connected to a ground bar in a circuit breaker distribution panel, wherein the ground bar is bonded to a neutral bar in the circuit breaker distribution panel. An earth ground connection 16 is made from the ground bar in the circuit breaker distribution panel to the earth ground terminal 100E of the intelligent circuit interrupter device 100. Similar ground connections are made from other receptacles or devices (e.g., the load 20) on the branch circuit to the ground bar in the circuit breaker distribution panel. The earth ground connection 16 provides an alternative low-resistance path for ground-fault return current to flow in the event of an occurrence of a ground-fault condition within the intelligent circuit interrupter device 100 or the load 20.

In some embodiments, the circuit breaker 15 is configured to "trip" in response to over-current and short-circuit fault conditions. As noted above, an over-current condition occurs when equipment is operated in excess of its normal, full-load rating, or a branch circuit in excess of its ampacity which, when the over-current condition persists for a sufficient period of time, would cause damage or dangerous overheating. A short-circuit fault condition comprises an unintended or accidental load condition that produces a much higher current overload than an over-current condition, depending on the impedance of the fault. As noted above, a fault producing the maximum over-current condition is referred to as a short-circuit or a "bolted fault." In some embodiments, the circuit breaker 15 is not an AFCI protection device.

In some embodiments, the circuit breaker 15 comprises an electromechanical circuit breaker which comprises elements such as a mechanical AC switch (e.g., air-gap switch), a mechanical actuator mechanism, an electromagnetic actuator element (e.g., a solenoid), a thermal actuator element (e.g., bimetallic element), and a manual switch. In some embodiments, the mechanical air-gap switch comprises first and second contacts which are physically closed or separated by operation of the mechanical actuator mechanism (e.g., latch mechanism with spring element). In particular, the mechanical actuator mechanism is configured to physically close the first and second contacts together in response to manual actuation of the manual switch to an "On" position and thereby allow current to flow in an electrical path between the line input terminal 15A and load output terminal 15B of the circuit breaker 15. In addition, the mechanical actuator mechanism is configured to physically separate the first and second contacts of the mechanical AC switch (i.e., trip the circuit breaker 15) either manually in response to a manual actuation of the manual switch to an "Off" position, or automatically in response to the occurrence of short-circuit condition or prolonged over-current condition. When the circuit breaker 15 is manually or automatically tripped, an air-gap is created between the first and second contacts of the mechanical AC switch.

In particular, the electromagnetic actuator element (e.g., solenoid) is configured to be magnetically actuated in response to large surges in current generated by e.g., short-circuit events, wherein actuation of the electromagnetic element causes mechanical actuation of the actuator mechanism to separate the first and second contacts of the AC switch and thereby trip the circuit breaker 15. In addition, the thermal actuator element (e.g., bimetallic element) is configured to be thermally actuated in response to a prolonged excess over-current condition, wherein actuation of the thermal actuator element causes mechanical actuation of the actuator mechanism to separate the first and second contacts of the AC switch and thereby trip the circuit breaker 15. In this regard, the electromagnetic element of the circuit breaker 15 responds instantaneously to large surges in current (short-circuits) while the thermal actuator element responds to less extreme but longer-term over-current conditions. Once tripped, the circuit breaker 15 must be manually reset using the manual switch (e.g., toggle the manual switch to the "Off" position and then to the "On" position).

In some embodiments, the intelligent circuit interrupter device 100 comprises a solid-state switch 101/102 which is serially connected in an electrical path between the line hot terminal 100A and the load hot terminal 100C, control circuitry 110, and internal short-circuit switch circuitry 120. The internal short-circuit switch circuitry 120 comprises an internal short-circuit switch 121/122 and a short-circuit current limiting resistor R4 (alternatively referred to herein as shunt resistor R4) serially connected between a first node N1 and a second node N2. The first node N1 is coupled to the line hot terminal 100A, and the second node N2 is coupled to the line neutral terminal 100B. The control circuitry 110 is coupled to the solid-state switch 101/102 and to the internal short-circuit switch circuitry 120. As explained in further detail below, the control circuitry 110 is configured to (i) detect for an occurrence of a fault condition, (ii) drive the solid-state switch 101/102 into a switched-off state in response to detecting the occurrence of a fault condition, and (iii) activate the internal short-circuit switch 121/122 in response to detecting the occurrence of a fault condition to thereby generate an internal short-circuit path between the first node N1 and the second node N2 and allow short-circuit current to flow through the shunt resistor R4 between the line hot terminal 100A and the line neutral terminal 100B of the circuit interrupter device 100 to thereby cause the circuit breaker 15 to trip and disconnect the AC mains 10 from the branch circuit.

The solid-state switch 101/102 comprises a first switch 101 and a second switch 102 which form a bidirectional solid-state switch. In some embodiments, a current sensor 105 is serially connected between the first and second switches 101 and 102. In some embodiments, the first and second switches 101 and 102 each comprise a metal-oxide-semiconductor field-effect transistor (MOSFET) switch (e.g., power MOSFET switches). In some embodiments, the first and second switches 101 and 102 comprise N-type enhancement MOSFET devices. The first and second switches 101 and 102 are serially connected back-to-back and have source (S) terminals that are coupled through the current sensor 105, and commonly connected gate (G) terminals which are connected to the control circuitry 110. The first switch 101 comprises a drain terminal which is coupled to the line hot terminal 100A, and the second switch 102 comprises a drain terminal which is coupled to the load hot terminal 100C.

As further shown in FIG. 1, the first and second MOSFET switches 101 and 102 comprise intrinsic body diodes 101-1 and 102-1, respectively, where each body diode represents a P-N junction between a P-type substrate body to an N-doped drain region of the MOSFET switch. The body diodes 101-1 and 102-1 are intrinsic elements of the MOSFET switches 101 and 102 (i.e., not discrete elements) and, thus, are shown with dashed-line connections. It is to be noted that the intrinsic body-to-source diodes of the MOSFET switches 101 and 102 are not shown as they are shorted out by the connections between the source regions and the substrate bodies (e.g., N+ source and P-doped body junction are shorted through source metallization).

The solid-state switch 101/102 is configured to (i) allow the bidirectional flow of load current between the line hot terminal 100A and the load hot terminal 100C of the intelligent circuit interrupter device 100 when the solid-state switch 101/102 is in switched-on state and (ii) block the bidirectional flow of load current between the line hot terminal 100A and the load hot terminal 100C of the intelligent circuit interrupter device 100 when the solid-state switch 101/102 is in switched-off state.

The control circuitry 110 comprises the current sensor 105 and one or more integrated circuits blocks which implement circuit breaker actuator circuitry 111, switch control circuitry 112, current limit detection circuitry 113, a digital signal processor 114, a power measurement microprocessor 115, AC-to-DC converter circuitry 116, voltage sensor circuitry 117, and wireless control circuitry 118, the functions of which will be explained in further detail below. As noted above, the internal short-circuit switch circuitry 120 comprises the internal short-circuit switch 121/122 and the shunt resistor R4 serially connected between the first node N1 and the second node N2. As further shown in FIG. 1, the internal short-circuit switch circuitry 120 comprises switch biasing circuitry 123 (alternatively referred to herein as a self-biasing circuit 123), and an actuation switch 124. The switch biasing circuitry 123 comprises first and second resistors R1 and R2, first and second diodes D1 and D2, a third resistor R3, a capacitor C1, and a Zener diode ZD.

In some embodiments, the internal short-circuit switch 121/122 comprises a bidirectional solid-state switch comprising a first MOSFET switch 121 and a second MOSFET switch 122, which comprise intrinsic body diodes 121-1 and 122-1, respectively. The first and second MOSFET switches 121 and 122 comprise gate (G) terminals that are commonly coupled to a third node N3, and source (S) terminals that are commonly coupled to a fourth node N4, wherein the fourth node N4 comprises a virtual ground node of the internal short-circuit switch circuitry 120. The gate (G) terminals of the first and second MOSFET switches 121 and 122 are connected to the switch biasing circuitry 123 through the third node N3. The first MOSFET switch 121 comprises a drain (D) terminal that is coupled to the first node N1, and the second MOSFET switch 122 comprises a drain (D) terminal that is coupled to the second node N2 through the shunt resistor R4. In some embodiments such as shown in FIG. 1, the shunt resistor R4 is connected between the drain terminal of the second MOSFET switch 122 and the second node N2. In other embodiments, the shunt resistor R4 can be connected between the drain terminal of the first MOSFET switch 121 and the first node N1.

As further shown in FIG. 1, the actuation switch 124 is coupled between the third node N3 and the fourth node N4. The first and second MOSFET switches 121 and 122 essentially operate as an internal short-circuit switch that is activated/deactivated by operation of the actuation switch 124. In some embodiments, the actuation switch 124 comprises a bipolar junction transistor (BJT) (e.g., NPN BJT) or an Insulated Gate Bipolar Transistor (IGBT), which has a base (B) terminal coupled to the circuit breaker actuator circuitry 111, an emitter (E) terminal coupled to the commonly connected source (S) terminals of the first and second MOSFET switches 121 and 122 (at the fourth node N4), and a collector (C) terminal connected to the commonly connected gate (G) terminals of the first and second MOSFET switches 121 and 122 (at the third node N3).

Moreover, the switch biasing circuitry 123 comprises a self-biasing circuit that is configured to generate a regulated direct current (DC) voltage using current drawn from an AC power source applied to the line hot and line neutral terminals 100A and 100B of the circuit interrupter device 100, and to apply the regulated DC voltage to the gate terminals of the first and second MOSFET switches 121 and 122 of the internal short-circuit switch through the resistor R3. The self-biasing circuit comprises a voltage clamping circuit that is configured to generate the regulated DC voltage, wherein the voltage clamping circuit comprises the capacitor C1 and the Zener diode ZD, which are connected in parallel between a fifth node N5 and the fourth node N4. In addition, the self-biasing circuit comprises the first resistor R1 and the first diode D1 serially connected between the first node N1 and the fifth node N5, and the second resistor R2 and the second diode D2 serially connected between the second node N2 and the fifth node N5. The operation of the internal short-circuit switch circuitry 120 will be discussed in further detail below.

In some embodiments, the control circuitry 110 controls the activation and deactivation of the bidirectional solid-state switch 101/102 by operation of the switch control circuitry 112. In some embodiments, the switch control circuitry 112 is configured to generate a gate control signal that is applied to the gate terminals of the first and second MOSFET switches 101 and 102 to place the bidirectional solid-state switch 101/102 into a switched-on state or a switched-off state. In particular, during normal operation of the intelligent circuit interrupter device 100, the switch control circuitry 112 applies a gate control signal to the gate terminals of the first and second MOSFET switches 101 and 102 to place the bidirectional solid-state switch 101/102 in a switched-on state, which allows the bidirectional flow of AC load current between the line hot terminal 100A and the load hot terminal 100C of the intelligent circuit interrupter device 100.

On the other hand, when a given circuit block of the control circuitry 110 detects an occurrence of a fault condition or abnormal operating condition (e.g., series arcing, parallel arcing, short-circuit condition, over-current condition, ground-fault condition, abnormal load power profile, etc.), the control circuitry 110 will generate a fault detection control signal. In response to the fault detection control signal, the switch control circuitry 112 applies a gate control signal to the gate terminals of the first and second MOSFET switches 101 and 102 to place the bidirectional solid-state switch 101/102 into a switched-off state to thereby interrupt (i.e., block) the bidirectional flow of AC load current between the line hot terminal 100A and the load hot terminal 100C of the intelligent circuit interrupter device 100 and, thus, interrupt the flow of load current to the load 20.

The control circuitry 110 is configured to monitor voltages (e.g., VL, VN, etc.) at various nodes within the intelligent circuit interrupter device 100, as well as monitor load current which flows in the electrical path through the intelligent circuit interrupter device 100 between the line hot terminal 100A and the load hot terminal 100C, and utilize the monitored current and voltages to perform functions such as measuring power usage and profiles of the load, detecting fault conditions, etc. For example, the load current sensor 105 is configured to sense the flow of load current in the hot line path between the line hot terminal 100A and the load hot terminal 100C of the intelligent circuit interrupter device 100. The load current sensor 105 can be implemented using any suitable type of current sensing element including, but not limited to, a current-sensing resistor, a current amplifier, a Hall Effect current sensor, etc.

The output of the load current sensor 105 is input to various circuit blocks of the control circuitry 110 to detect for the occurrence of fault conditions and to detect for abnormal power profiles of the load 20 based, at least in part on, the magnitude and/or the AC waveform characteristics of the detected load current. The output of the current sensor 105 will vary depending on the type of current sensor 105 that is implemented. For example, in some embodiments, the output of the current sensor 105 can be a voltage which is generated across a sense resistor as a result of load current flowing through the sense resistor. In some embodiments, the output for the current sensor 105 can be a fault detection signal which is generated in response to the current sensor 105 detecting an over-current condition, etc. In other embodiments, a second current sensor can be implemented to sense the flow of load current in a neutral line path between the line neutral terminal 100B and the load neutral terminal 100D of the intelligent circuit interrupter device 100.

The voltage sensor circuitry 117 is configured to sense the voltage level at different nodes within the intelligent circuit interrupter device 100. For example, in the exemplary embodiment of FIG. 1, the voltage sensor circuitry 117 is configured to sense a hot line voltage VL at a point along the electrical path between the line hot terminal 100A and the load hot terminal 100C of the intelligent circuit interrupter device 100. In addition, the voltage sensor circuitry 117 is configured to sense a neutral line voltage VN at a point along the electrical path between the line neutral terminal 100B and the load neutral terminal 100D of the intelligent circuit interrupter device 100.

The voltage sensor circuitry 117 can be implemented using any suitable type of voltage sensing circuitry including, but not limited to, zero-crossing detector circuits. A zero-crossing detector is configured to receive as input an AC waveform, compare the input AC waveform to a zero-reference voltage (e.g., line neutral voltage), and detect the AC waveform transition from positive and negative, which coincides when the AC waveform crosses the zero-reference voltage. In some embodiments, the zero-crossing detector circuitry is configured to generate a square wave output which transitions between a logic "1" and logic "0" output upon each zero-crossing detection of the AC voltage waveform. In other embodiments, the zero-crossing detector circuitry is configured to generate a short-lived pulse (~3 us) having an RC-adjustable duration. In some embodiments, the voltage sensor circuitry 117 comprises voltage divider circuitry which is configured to divide the sensed voltages VL, VN, etc., down to a lower voltage level and output voltages which are a fraction of the voltage levels of the input voltages VL, VN, etc., wherein the lower voltage levels are input to various circuit blocks (e.g., the digital signal processor 114, the power measurement microprocessor 115, etc.) of the control circuitry 110 to perform fault detection and power measurement functions.

The current limit detection circuitry 113 is configured to detect fault conditions such as over-current and short-circuit conditions based on the magnitude (e.g., RMS value, peak current, etc.) of the AC current waveform that is detected by the current sensor 105. For example, in some embodiments, the current sensor 105 comprises a sense resistor that generates a "sense voltage" based on an amount of load current flowing through the sense resistor, and the current limit detection circuitry 113 is configured to measure the sense voltage and determine if the sense voltage exceeds a pre-determined value which is indicative of a short-circuit fault condition. In response to detecting a fault condition, the current limit detection circuitry 113 outputs a fault detection control signal to the switch control circuitry 112, which causes the switch control circuitry 112 to deactivate the first and second MOSFET switches 101 and 102.

The power measurement microprocessor 115 is configured to utilize the sensed current and voltages (e.g., outputs of the current sensor 105 and voltage sensor circuitry 117) to determine the amount of power delivered to the load 20. In some embodiments, the power measurement microprocessor 115 comprises an application-specific integrated circuit (ASIC) which is specifically designed to measure power and energy in a power line system and process instantaneous voltage and current waveforms to compute RMS values of voltage and currents, active, reactive and apparent power and energies. In other embodiments, the power measurement microprocessor 115 comprises an "off-the-shelf" application-specific standard product (ASSP) chip that implements the desired power measurement functionalities.

In some embodiments, the power measurement microprocessor 115 is configured to measure power usage of the load 20 and maintain such power usage information over time for historical analysis. In some embodiments, the power measurement microprocessor 115 is configured to detect for abnormal load power usage or abnormal power profiles. For example, the power measurement microprocessor 115 can be configured to detect power profiles that are indicative of high resistance connections (known as glowing connections) which can cause fires, and other abnormal power profiles associated with, e.g., high line voltages or low line voltages, etc. In response to detecting the existence of an abnormal load power usage or abnormal power profiles, the power measurement microprocessor 115 can be configured to output a fault detection control signal to the switch control circuitry 112, which causes the switch control circuitry 112 to deactivate the first and second MOSFET switches 101 and 102.

In some embodiments, the digital signal processor 114 is configured to detect for the occurrence of arc-fault conditions. More specifically, in some embodiments, the digital signal processor 114 is configured as an arc signal analyzer which digitally samples the sensed voltage waveforms and/or sensed current waveforms to identify certain characteristics in the sampled voltage and current waveforms which are indicative of arcing waveforms. For instance, the digital signal processor 114 can be configured to sample the sensed voltage and/or current waveforms in small increments (e.g., microseconds) and compare the characteristics of the sampled waveforms to known characteristics of arcing waveforms to determine if an arcing condition exists, wherein certain abnormal characteristics in the amplitude or time period of the sampled waveforms are indicative of arcing conditions. In particular, decreased voltage, decreased current, changes in expected zero-voltage crossing timing, loss of zero-voltage crossing, etc., are conditions that can be indicative of arcing conditions. In some embodiments, if multiple features indicative of an arcing condition exist in two or more cycles of the AC mains 10, the digital signal processor 114 can determine that an arcing condition exists.

Figure 2:
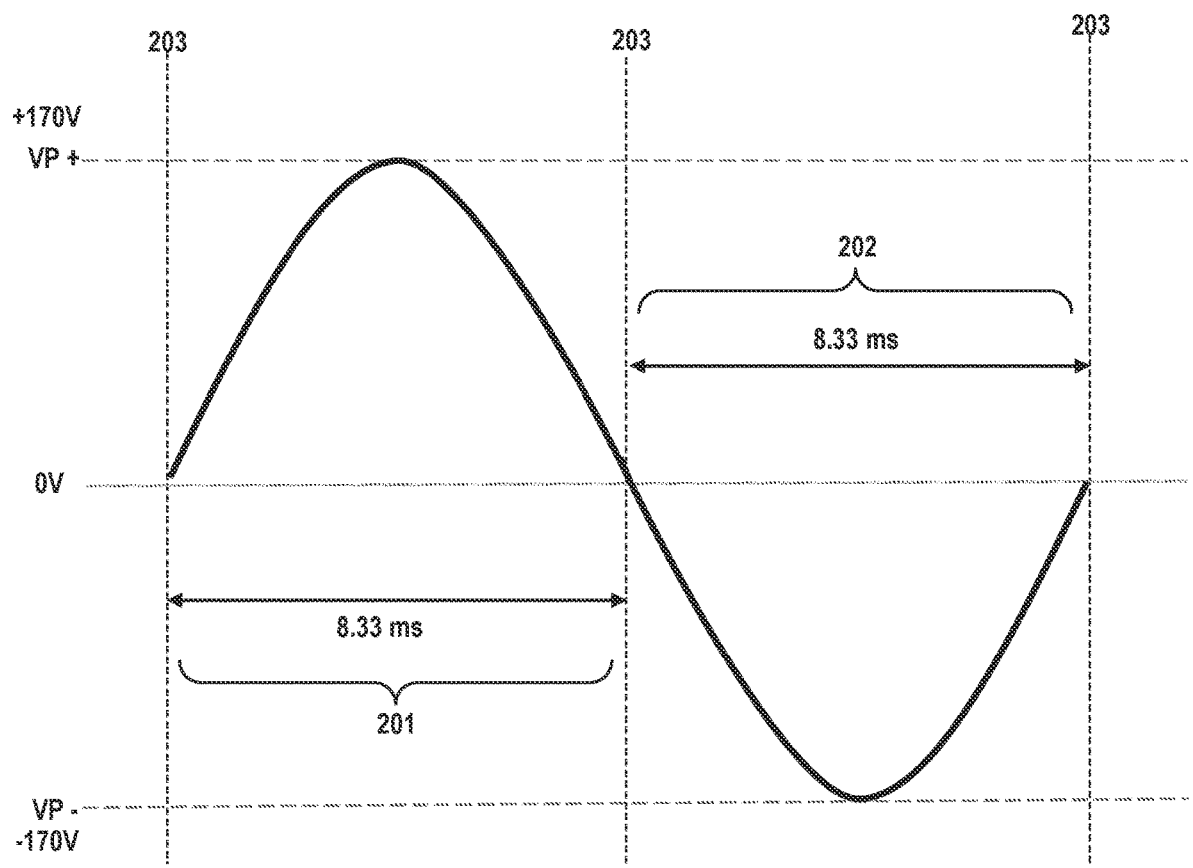
FIG. 2 schematically illustrates an exemplary AC waveform of utility supply power under normal operating conditions without arc-fault conditions.

For example, FIG. 2 schematically illustrates an exemplary AC voltage waveform 200 of utility supply power that can be provided by the AC mains 10. In particular, FIG. 2 schematically illustrates an exemplary AC waveform 200 of utility supply power under normal operating conditions without arc-fault conditions The AC waveform 200 comprises a sine wave with respective positive and negative half-cycles 201 and 202. The AC waveform 200 has a positive peak voltage VP+ in the positive half-cycle 201, and a negative peak voltage VP− in the negative half-cycle 202, and voltage zero-crossings (0V) 203. For example, for utility power of 120 Vrms, the positive peak voltage VP+ is about 170V and the negative peak voltage VP− is about −170V. The exemplary AC waveform 200 is illustratively a 60 Hz signal with a period of about 16.66 milliseconds, wherein each half-cycle 201 and 202 has a duration of about 8.33 milliseconds.

When an arc-fault occurs, the exemplary AC voltage waveform 200 in FIG. 2 can be distorted in various ways. For example, the distorted AC voltage waveform 200 can have high-frequency AC components (e.g., 100 kHz or more) that cause voltage rippling of the AC voltage waveform. The distorted AC waveform 200 can have decreased peak voltages, whereby the AC waveform does not reach the expected peak voltages VP+ and VP−. Further, the distorted AC voltage waveform can have abnormal zero-voltage crossings which do not occur at the expected times of the zero-voltage crossings 203 shown in FIG. 2. In addition, the distorted AC voltage waveform can have significant asymmetry in the waveform profiles in the positive and negative half cycles 201 and 202, which significantly deviates from the symmetric profiles of a normal AC voltage waveform such as shown in FIG. 2.

In some embodiments, the digital signal processor 114 can digitally sample a sensed AC voltage waveform every microsecond, which provides 1000 samples per each millisecond of the sampled AC waveform. For an exemplary AC voltage waveform 200 as shown in FIG. 2 with a period of 16.67 milliseconds (60 Hz signal), the digital sampling of the AC voltage waveform (and associated current waveform) once every microsecond or several microseconds can provide a significant amount of information to analyze various characteristics of the AC voltage waveform to determine the existence of an arcing condition.

In response to detecting the existence of an arcing condition, the digital signal processor 114 will output a fault detection control signal to the switch control circuitry 112, which causes the switch control circuitry 112 to deactivate the first and second MOSFET switches 101 and 102. In addition, as explained in further detail below, in response to detecting an arcing condition, the digital signal processor 114 will output the fault detection control signal to the circuit breaker actuator circuitry 111, which causes the circuit breaker actuator circuitry 111 to activate an internal short-circuit switch (e.g., the bidirectional solid-state switch 121/122) within the internal short-circuit switch circuitry 120. The activation of the internal short-circuit switch causes an internal short-circuit path to be created between the line hot terminal 100A and the line neutral terminal 100B of the intelligent circuit interrupter device 100 with a controlled amount of short-circuit current flowing through the shunt resistor R4 that is serially coupled between the line hot terminal 100A and the line neutral terminal 100B. The flow of the internal short-circuit current within the intelligent circuit interrupter device 100 causes the circuit breaker 15 to trip and disconnect AC power from the branch circuit.

The AC-to-DC converter circuitry 116 is configured to provide DC supply power to the circuit blocks 111, 112, 113, 114, 115, 117, and 118 of the intelligent circuit interrupter device 100. In some embodiments, the AC-to-DC converter circuitry 116 is connected between the hot line (e.g., VL) and the neutral line (e.g., VN) and is configured to convert the AC power delivered by the AC mains 10 to a regulated DC supply voltage that is used to power the various circuit blocks of the control circuitry 110. In some embodiments, the AC-to-DC converter circuitry 116 comprises sufficient storage capacitance to power the control circuitry 110 immediately following a utility outage such that relevant power outage or short-circuit information may be obtained and stored as the utility power collapses, and then wirelessly transmitted to a remote node, device, or system using the wireless control circuitry 118. The AC-to-DC converter circuitry 116 may also include sufficient capacitance to maintain sufficient DC power the control circuitry 110 during a load short-circuit event, to thereby allow the control circuitry 110 to properly operate and deactivate the bidirectional solid-state switch 101/102 and interrupt power to the load 20.

In some embodiments, the wireless control circuitry 118 comprises a radio frequency (RF) transceiver to wirelessly communicate with a remote node, device, system, etc., to support remote monitoring of energy utilization and detection of fault conditions. In addition, the wireless control circuitry 118 is configured to enable wireless communication with the intelligent circuit interrupter device 100 to allow a technician, electrician, or a remote compute node, for example, to remotely control the intelligent circuit interrupter device 100 using predetermined commands. The wireless control circuitry 118 can implement any suitable wireless communication protocol such as Wi-Fi or WiMAX, Bluetooth, etc.

As noted above, the internal short-circuit switch circuitry 120 is configured to generate an internal short-circuit path between the line hot terminal 100A and the line neutral terminal 100B of the intelligent circuit interrupter device 100 in response to the detection of a fault condition such as an short-circuit condition, arc-fault condition, etc. When a fault condition is detected by a given circuit block of the control circuitry 110, the switch control circuitry 112 places the bidirectional solid-state switch 101/102 into a switched-off state, and the circuit breaker actuator circuitry 111 activates the internal short-circuit switch circuitry 120 to generate a controlled short-circuit current within the intelligent circuit interrupter 100 to thereby cause the circuit breaker 15 to trip. The internal short-circuit switch circuitry 120 is configured to generate a limited/controlled internal short-circuit current which flows between the line hot terminal 100A and the line neutral terminal 100B of the intelligent circuit interrupter device 100 through the shunt resistor R4 to effectively trip and shut off the circuit breaker 15.

While the bidirectional solid-state switch 101/102 of the intelligent circuit interrupter device 100 can be deactivated in response to the detection of an arc-fault condition to prevent current flow to the load 20, the deactivation of the bidirectional solid-state switch 101/102 will not protect against an arc-fault condition which occurs on the line side or otherwise upstream of the bidirectional solid-state switch 101/102 of the intelligent circuit interrupter device 100, and such upstream arc-fault condition may persist when the circuit breaker 15 does not implement arc-fault circuit interrupter functionality. In this regard, it is to be appreciated that the implementation of the internal short-circuit switch circuitry 120 within the intelligent circuit interrupter device 100 advantageously provides a cost-effective solution to provide AFCI protection for the entire branch circuit connected to the circuit breaker 15, despite the circuit breaker 15 not having AFCI functionality.

As shown in FIG. 1, the internal short-circuit switch circuitry 120 comprises a short-circuit path between the internal first node N1 (which is coupled to the line hot terminal 100A) and the internal second node N2 (which is coupled to the line neutral terminal 100B). The short-circuit path between the internal nodes N1 and N2 is generated when the bidirectional solid-state switch 121/122 is activated to cause a controlled short-circuit current to flow through the shunt resistor R4 between the internal nodes N1 and N2. The first and second MOSFET switches 121 and 122 essentially operate as an internal short-circuit switch that is activated/deactivated by operation of the actuation switch 124.

As noted above, the switch biasing circuitry 123 comprises a self-biasing circuit which is configured to generate a regulated DC voltage on node N5, which is used to drive the gate (G) terminals of the first and second switches 121 and 122 and turn on the first and second switches, when the actuation switch 124 is turned-off. When the actuation switch 124 is turned on, the gate (G) and source (S) terminals of the first and second switches 121 and 122 are effectively shunted/shorted (e.g., $V_{GS}$ is approximately 0V), which results in maintaining the first and second switches 121 and 122 of the bidirectional solid-state switch 121/122 in a switched-off state. On the other hand, when the actuation switch 124 is turned-off, the self-generated, regulated DC voltage at node N5 is applied to the commonly connected gate (G) terminals of the first and second switches 121 and 122, which causes the first and second switches 121 and 122 to turn on and thereby generate an internal short-circuit path between the internal first and second nodes N1 and N2, i.e., between the line hot terminal 100A and the line neutral terminal 100B of the intelligent circuit interrupter device 100. When the internal short-circuit path is generated, the shunt resistor R4 will control the magnitude of the internal short-circuit current which flows between the line hot terminal 100A and the line neutral terminal 100B to trip the circuit breaker 15.

In some embodiments, the operation (activation/deactivation) of the actuation switch 124 is controlled by the circuit breaker actuation circuitry 111, wherein the circuit breaker actuation circuitry 111 generates and outputs a control voltage to the base (B) terminal of the actuation switch 124 to activate or deactivate the actuation switch 124. During normal operation of the intelligent circuit interrupter device 100, the circuit breaker actuation circuitry 111 outputs a control voltage to the base (B) terminal of the actuation switch 124 to maintain the actuation switch 124 in a turned-on state, to maintain the first and second switches 121 and 122 in a turned-off state. When the control circuitry 110 detects a fault condition (e.g., an arc-fault condition detected by the digital signal processor 114), a fault detection control signal is generated and applied to the switch control circuitry 112 and the circuit breaker actuator circuitry 111. In response to the fault detection control signal, the circuit breaker actuator circuitry 111 generates and outputs a control voltage to the base (B) terminal of the actuation switch 124 to deactivate (turn-off) the actuation switch 124. The deactivation of the actuation switch 124 results in the activation of the internal short-circuit switch (i.e., activation of the first and second switches 121 and 122), which causes an internal short-circuit path to be created between the line hot terminal 100A and the line neutral terminal 100B (between nodes N1 and N2) of the intelligent circuit interrupter device 100 with short-circuit current flowing through the shunt resistor R4 that is serially coupled between the line hot terminal 100A and the line neutral terminal 100B.

More specifically, in some embodiments, the internal short-circuit switch circuitry 120 operates as follows. During power-up of the intelligent circuit interrupter device 100 (i.e., when AC mains 10 power is applied across the line hot terminal 100A and the line neutral terminal 100B of the intelligent circuit interrupter device 100) and normal operation, the circuit breaker actuation circuitry 111 generates and outputs a control voltage to the base terminal of the actuation switch 124 to place the actuation switch 124 in a turned-on state. When the actuation switch 124 is in the turned-on state, the gate (G) and source (S) terminals of the first and second switches 121 and 122 are effectively shunted/shorted, which results in maintaining the first and second switches 121 and 122 of the internal short-circuit switch in a switched-off state. As such, no short-circuit current flows in the path between the internal nodes N1 and N2.

In some embodiments, as noted above, the fourth node N4 serves as a virtual ground node of the internal short-circuit switch circuitry 120, wherein the voltage VS (e.g., virtual ground voltage) on the node N4 is utilized as a ground reference by the control circuitry 110 (e.g., the circuit breaker actuator circuitry 111) to drive the base (B) terminal of the actuation switch 124. More specifically, during normal operation of the intelligent circuit interrupter device 100, the control circuitry 110 will apply a drive voltage the base (B) terminal of the actuator switch 124 such that a base-to-emitter ($V_{BE}$) voltage will be at least equal to or greater than the threshold voltage (e.g., 0.7V) of the actuator switch 124. The drive voltage ($V_{BE}$) that is applied to the base (B) terminal of the actuator switch 124 is generated with reference to the voltage VS of the virtual node N4. When the actuator switch 124 is to be deactivated, the control circuitry 110 will essentially apply the virtual ground voltage VS to the base (B) terminal of the actuator switch 124 (e.g., couple the virtual ground node N4 to the base (B) terminal of the actuator switch 124), which causes the actuation switch 124 to be turned off.

Furthermore, during power-up of the intelligent circuit interrupter device 100, the switch biasing circuitry 123 operates to charge the capacitor C1 to a maximum voltage which is clamped by the reverse breakdown voltage (referred to as "Zener voltage") of the Zener diode ZD. In some embodiments, the Zener voltage is in a range of about 10V to about 15V. In particular, during a positive half-cycle of the AC mains 10, current flows along the path through the first resistor R1, the first diode D1, the capacitor C1, the intrinsic body diode 122-1 of the second switch 122, and the shunt resistor R4, to charge the capacitor C1. During a negative half-cycle of the AC mains 10, current flows along the path through the second resistor R2, the second diode D2, the capacitor C1, and the intrinsic body diode 121-1 of the first switch 121 to charge the capacitor C1. Accordingly, during the initial power-up phase of the intelligent circuit interrupter device 100, one or more cycles of the AC mains 10 causes the capacitor C1 to be charged to the Zener voltage of the Zener diode ZD, which is greater than the threshold voltage, $V_T$, of the first and second switches 121 and 122.

During operation of the intelligent circuit interrupter device 100, a given circuit block of the control circuitry 110 may detect a fault condition such as short-circuit condition, an over-current condition, an arc-fault condition, etc., as a result of analyzing sensor data obtained from, e.g., the current sensor 105 and/or the voltage sensor circuitry 117. For instance, the digital signal processor 114 may detect the occurrence of an arcing waveform that exists either internally within the intelligent circuit interrupter device 100 or external (line side or load side) to the intelligent circuit interrupter device 100. In response, the control circuitry 110 generates a fault detection signal which triggers the circuit breaker actuator circuitry 111 to generate a control signal to deactivate the actuation switch 124 of the internal short-circuit switch circuitry 120. The deactivation of the actuation switch 124 results in the activation of the internal short-circuit switch (i.e., activation of the first and second switches 121 and 122), which in turn generates an internal short-circuit path between the nodes N1 and N2, which results in a shunt connection between the line hot terminal 100A and the line neutral terminal 100B of the intelligent circuit interrupter device 100. The internal short-circuit path which is generated within the intelligent circuit interrupter device 100 causes over-current to flow through the circuit breaker 15 and thereby trip the circuit breaker 15 and create an air-gap in the electrical path between the line hot 11 of the AC mains 10 and line hot terminal 100A of the intelligent circuit interrupter device 100. The air-gap serves to electrically isolate the line hot 11 of the AC mains 10 from the load 20.

The magnitude of the internal short-circuit current which flows in the internal short-circuit path generated by operation of the internal short-circuit switch circuitry 120 is limited by the resistance value of the shunt resistor R4. In some embodiments, the resistance of the shunt resistor R4 is selected so that a magnitude of the internal short-circuit current which flows in the short-circuit path between the nodes N1 and N2 within the intelligent circuit interrupter device 100 is in range of about 2× to about 3× the current rating of the circuit breaker 15. For example, if the circuit breaker 15 has a current rating of 20 amperes, the resistance of the shunt resistor R4 is selected so that a maximum of approximately 40 to 60 amperes of current flows through the circuit breaker 15 and through the short-circuit path between the nodes N1 and N2 within the intelligent circuit interrupter device 100, to thereby cause the circuit breaker 15 to trip. In this regard, the magnitude of the short-circuit current which flows through the circuit breaker 15 is limited by the magnitude of the internal short-circuit current that is generated in the short-circuit path between the nodes N1 and N2 based on the resistance value of the shunt resistor R4. In this instance, the amount of short-circuit current that is generated to trip the circuit breaker 15 is controlled/limited by the shunt resistor R4, which further limits the amount of electrical arcing that is generated between the contacts of the air-gap switch of the circuit breaker 15 when the circuit breaker 15 is tripped.

Figure 3:
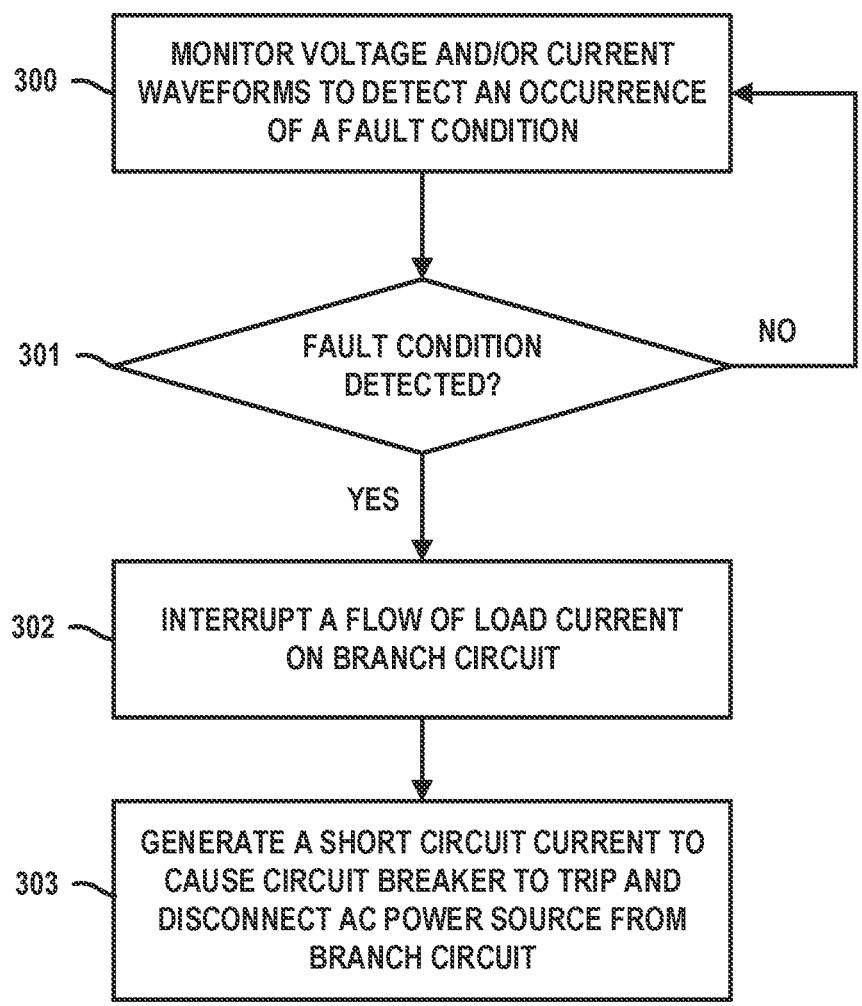
FIG. 3 is a flow diagram of a method for providing circuit interruption, according to an exemplary embodiment of the disclosure.

FIG. 3 is a flow diagram of a method for providing circuit interruption, according to an exemplary embodiment of the disclosure. More specifically, FIG. 3 illustrates a high-level mode of operation of the intelligent circuit interrupter device 100 of FIG. 1, according to an exemplary embodiment of the disclosure. The method comprises monitoring a voltage waveform and/or a current waveform to detect for the occurrence of a fault condition on a branch circuit that is protected by a circuit breaker (block 300). For example, as noted above, the control circuitry 110 of the intelligent circuit interrupter device 100 is configured to monitor and sense voltage waveforms and load current waveforms, e.g., at points along (i) the electrical path between the line hot terminal 100A and the load hot terminal 100C, and/or (ii) the electrical path between the line neutral terminal 100B and the load neutral terminal 100D. When the intelligent circuit interrupter device 100 detects an occurrence of a fault condition on the branch circuit (affirmative determination in block 301), the intelligent circuit interrupter device 100 will interrupt a flow of load current on the branch circuit (block 302) and generate an internal short-circuit path within the intelligent circuit interrupter device 100 to allow a short-circuit current to flow through a shunt resistor within the intelligent circuit interrupter device 100, wherein the flow of the short-circuit current within the intelligent circuit interrupter device causes the circuit breaker to trip and disconnect an AC power source from the branch circuit (block 303).

In the exemplary embodiment of FIG. 1, the intelligent circuit interrupter device 100 comprises a single-pole single-throw (SPST) switch configuration wherein the first and second MOSFET switches 101 and 102 of the bidirectional solid-state switch are serially connected back-to-back in the electrical path between the line hot terminal 100A and the load hot terminal 100C. In other embodiments, an intelligent circuit interrupter device comprises a double-pole single-throw (DPST) switch configuration, wherein the first MOSFET switch 101 is connected in the electrical path between the line hot terminal 100A and the load hot terminal 100C, and the second MOSFET switch 102 is connected in the electrical path between the line neutral terminal 100B and the load neutral terminal 100D. In the DPST configuration, the drain (D) terminal of the second MOSFET switch 102 would be coupled to the line neutral terminal 100B, while the source (S) terminal of the second MOSFET switch 102 would be coupled to the load neutral terminal 100D. In the DPST switch configuration, the gate (G) terminals of the first and second MOSFET switches 101 and 102 would be concurrently controlled by the control circuitry 110 (e.g., the switch control circuitry 112) as in the SPST switch configuration of FIG. 1 as discussed above, whereby deactivation of the first and second MOSFET switches 101 and 102 would effectively disconnect the line hot terminal 100A and the load hot terminal 100C, as well as effectively disconnect the line neutral terminal 100B and the load neutral terminal 100D.

It is to be understood that intelligent circuit interrupter devices according to exemplary embodiments of the disclosure can be embodied in various devices and applications. For example, in some embodiments, the intelligent circuit interrupter device 100 of FIG. 1 can be implemented or otherwise integrated in an electrical receptacle device (e.g., branch outlet), or in an electrical light switch (e.g., a wall-mounted light switch, or a light switch implemented in a smart light fixture or smart ceiling light bulb socket, etc.), or other types of devices which provide power to a load. In other embodiments, the intelligent circuit interrupter device 100 of FIG. 1 may comprise a standalone device which is disposed within a gang box in an electrical network of a home or building and configured to protect one or more electrical devices, appliances, loads, etc. that are connected in a branch circuit downstream of the standalone intelligent circuit interrupter device.

It is to be appreciated that the exemplary intelligent circuit interrupter devices and methods as disclosed herein provide various technical advantages. For example, the implementation of the bidirectional solid-state switch 101/102 allows the intelligent circuit interrupter device 100 to rapidly respond to imminent fault conditions such as arc-fault conditions, over-current fault conditions, load-side short-circuit fault conditions, internal fault conditions, ground-fault conditions, over-voltage conditions, etc., by rapid deactivation of the bidirectional solid-state switch 101/102. Indeed, the response time for deactivating the bidirectional solid-state switch 101/102 to isolate a fault condition can be on the order of 1000 times faster than the response time associated with the automatic tripping of an electromechanical AC switch of a conventional circuit breaker to isolate a fault condition such as a short-circuit or over-current condition (e.g., which is on the order of several milliseconds), as the solid-state state bidirectional switch 101/102 can transition from a switched-on state to a switched-off state on the order of microseconds or nanoseconds.

Moreover, as noted above, the implementation of the internal short-circuit switch circuitry 120 within the intelligent circuit interrupter device 100 advantageously provides a cost-effective solution to provide AFCI protection (and other protections such as ground fault circuit interrupter (GFCI) protection) for the entire branch circuit connected to the circuit breaker 15, despite the circuit breaker 15 not having AFCI functionality. For example, in an existing electrical distribution system which comprises conventional circuit breakers which provide no AFCI protection to branch circuits within a given home or building, an intelligent circuit interrupter device such as shown in FIG. 1 can be added as a first device (e.g., power receptacle having the integrated intelligent circuit interrupter device 100) in each branch circuit, to effectively provide AFCI protection without having to change the conventional circuit breakers to expensive AFCI circuit breakers.

Furthermore, the implementation of the internal short-circuit switch circuitry 120 within the intelligent circuit interrupter device 100, which is configured to generate a controlled short circuit current to trip a conventional circuit breaker having a mechanical AC air-gap switch, provides a mechanism to create an air-gap in the electrical path between the line hot 11 of the AC mains 10 and the load 20 to provide complete isolation of the AC mains 10 from the load 20 and prevent the flow of current from the line hot 11 to the load 20, as well as prevent the flow of leakage current that can be generated by the bidirectional solid-state switch 101/102 when the bidirectional solid-state switch 101/102 is in a switched-off state. This enables compliance with electrical codes which require the implementation of an air-gap in the electrical path between the AC mains and the branch circuit when a fault condition in the branch circuit occurs.

Although exemplary embodiments have been described herein with reference to the accompanying figures, it is to be understood that the current disclosure is not limited to those precise embodiments, and that various other changes and modifications may be made therein by one skilled in the art without departing from the scope of the appended claims.

We claim:
1. A circuit interrupter device, comprising:
a line hot terminal, a line neutral terminal, a load hot terminal, and a load neutral terminal;
a solid-state switch serially connected in an electrical path between the line hot terminal and the load hot terminal;
internal short-circuit switch circuitry comprising an internal short-circuit switch and a shunt resistor serially connected between a first node and a second node, wherein the first node is coupled to the line hot terminal and the second node is coupled to the line neutral terminal; and control circuitry coupled to the solid-state switch and the internal short-circuit switch circuitry;

wherein the control circuitry is configured to detect for an occurrence of a fault condition;

wherein the control circuitry is configured to drive the solid-state switch into a switched-off state in response to detecting the occurrence of a fault condition; and wherein the control circuitry is configured to activate the internal short-circuit switch in response to detecting the occurrence of a fault condition to thereby generate an internal short-circuit path between the first node and the second node and allow short-circuit current to flow through the shunt resistor between the line hot terminal and the line neutral terminal of the circuit interrupter device.

2. The circuit interrupter device of claim 1, wherein the internal short-circuit switch comprises a bidirectional solid-state switch comprising a first metal-oxide-semiconductor field-effect transistor (MOSFET) switch and a second MOSFET switch, wherein the first and second MOSFET switches comprise gate terminals that are commonly coupled to a third node, and source terminals that are commonly coupled to a fourth node, wherein the first MOSFET switch comprises a drain terminal that is coupled to the first node, and wherein the second MOSFET switch comprises a drain terminal that is coupled to the second node.

3. The circuit interrupter device of claim 2, wherein the shunt resistor is connected between the drain terminal of the second MOSFET switch and the second node.

4. The circuit interrupter device of claim 2, wherein the internal short-circuit switch circuitry comprises a self-biasing circuit that is configured to generate a regulated direct current (DC) voltage using current drawn from an alternating current (AC) power source applied to the line hot and line neutral terminals, and apply the regulated DC voltage to the gate terminals of the first and second MOSFET switches of the solid-state bidirectional switch.

5. The circuit interrupter device of claim 4, wherein the self-biasing circuit comprises a voltage clamping circuit that is configured to generate the regulated DC voltage, wherein the voltage clamping circuit comprises a capacitor and a Zener diode connected in parallel between a fifth node and the fourth node.

6. The circuit interrupter device of claim 2, wherein the internal short-circuit switch circuitry comprises an actuation switch coupled between the third node and the fourth node.

7. The circuit interrupter device of claim 6, wherein the control circuitry is configured to drive the actuation switch into one of (i) a switched-on state to thereby shunt the gate and source terminals of the first and second MOSFET switches and place the internal short-circuit switch in a switched-off state and (ii) a switched-off state to thereby allow the internal short-circuit switch to be placed in a switched-on state.

8. The circuit interrupter device of claim 1, wherein the shunt resistor comprises a resistance value which limits an amount of short-circuit current which flows between the line hot terminal and the line neutral terminal of the circuit interrupter device to no more than about 3× a current rating of a circuit breaker.

9. The circuit interrupter device of claim 1, wherein the control circuitry is configured to (i) sense a current waveform of a load current flowing in the electrical path between the line hot terminal and the load hot terminal and (ii) detect for an occurrence of a short-circuit fault condition based on the sensed current waveform.

10. The circuit interrupter device of claim 1, wherein the control circuitry is configured to (i) sense a voltage waveform on the electrical path between the line hot terminal and the load hot terminal and (ii) detect for an occurrence of an arc-fault condition based on the sensed voltage waveform.

11. A power receptable comprising the circuit interrupter device of claim 1.

12. A system comprising:

a circuit breaker comprising a line input terminal and a load output terminal, wherein the line input terminal of the circuit breaker is coupled to an alternating current (AC) power source; and a circuit interrupter device coupled to the load output terminal of the circuit breaker, wherein the circuit interrupter device comprises:

a line hot terminal, a line neutral terminal, a load hot terminal, and a load neutral terminal;

a solid-state switch serially connected in an electrical path between the line hot terminal and the load hot terminal;

internal short-circuit switch circuitry comprising an internal short-circuit switch and a shunt resistor serially connected between a first node and a second node, wherein the first node is coupled to the line hot terminal and the second node is coupled to the line neutral terminal; and control circuitry coupled to the solid-state switch and the internal short-circuit switch circuitry;

wherein the control circuitry is configured to detect for an occurrence of a fault condition;

wherein the control circuitry is configured to drive the solid-state switch into a switched-off state in response to detecting the occurrence of a fault condition; and wherein the control circuitry is configured to activate the internal short-circuit switch in response to detecting the occurrence of a fault condition to thereby generate an internal short-circuit path between the first node and the second node and allow short-circuit current to flow through the shunt resistor between the line hot terminal and the line neutral terminal of the circuit interrupter device, wherein the flow of short-circuit current between the line hot terminal and the line neutral terminal of the circuit interrupter device is sufficient to trip the circuit breaker.

13. The system of claim 12, wherein the circuit breaker comprises an electromechanical circuit breaker comprising at least one of electromagnetic actuator element and a thermal actuator element.

14. The system of claim 12, wherein the shunt resistor comprises a resistance value which limits an amount of short-circuit current which flows between the line hot terminal and the line neutral terminal of the circuit interrupter device to no more than about 3× a current rating of the circuit breaker.

15. The system of claim 12, wherein the internal short-circuit switch of the circuit interrupter device comprises a bidirectional solid-state switch comprising a first metal-oxide-semiconductor field-effect transistor (MOSFET) switch and a second MOSFET switch, wherein the first and second MOSFET switches comprise gate terminals that are commonly coupled to a third node, and source terminals that are commonly coupled to a fourth node, wherein the first MOSFET switch comprises a drain terminal that is coupled to the first node, and wherein the second MOSFET switch comprises a drain terminal that is coupled to the second node.

16. The system of claim 15, wherein:
the internal short-circuit switch circuitry of the circuit interrupter device comprises a self-biasing circuit that is configured to generate a regulated direct current (DC) voltage using current drawn from the AC power source, and apply the regulated DC voltage to the gate terminals of the first and second MOSFET switches of the solid-state bidirectional switch; and
the self-biasing circuit comprises a voltage clamping circuit that is configured to generate the regulated DC voltage, wherein the voltage clamping circuit comprises a capacitor and a Zener diode connected in parallel between a fifth node and the fourth node.

17. The system of claim 15, wherein:
the internal short-circuit switch circuitry comprises an actuation switch coupled between the third node and the fourth node; and
the control circuitry is configured to drive the actuation switch into one of (i) a switched-on state to thereby shunt the gate and source terminals of the first and second MOSFET switches and place the internal short-circuit switch in a switched-off state and (ii) a switched-off state to thereby allow the internal short-circuit switch to be placed in a switched-on state.

18. A method, comprising:
detecting, by a circuit interrupter device, an occurrence of a fault condition on a branch circuit that is protected by a circuit breaker;
interrupting, by the circuit interrupter device, a flow of load current on the branch circuit, in response to detecting the occurrence of the fault condition; and
generating, by the circuit interrupter device, a short-circuit path to allow a short-circuit current to flow through a shunt resistor within the circuit interrupter device, in response to detecting the occurrence of the fault condition, wherein the flow of the short-circuit current within the circuit interrupter device causes the circuit breaker to trip and disconnect an alternating current (AC) power source from the branch circuit.

19. The method of claim 18, wherein the shunt resistor comprises a resistance value which limits a magnitude of the short-circuit current to no more than about 3× a current rating of the circuit breaker.

20. The method of claim 18, wherein generating the short-circuit path comprises activating, by the circuit interrupter device, an internal short-circuit switch in response to detecting the occurrence of the fault condition to thereby generate an internal short-circuit path between a line hot terminal and a line neutral terminal of the circuit interrupter device, and allow the short-circuit current to flow through the shunt resistor between the line hot terminal and the line neutral terminal of the circuit interrupter device to cause the circuit breaker to trip.

* * * * *